US012351441B2

(12) United States Patent
Kato et al.

(10) Patent No.: US 12,351,441 B2
(45) Date of Patent: Jul. 8, 2025

(54) FORKLIFT AND FORKLIFT CONTROLLING METHOD

(71) Applicant: KABUSHIKI KAISHA TOYOTA JIDOSHOKKI, Kariya (JP)

(72) Inventors: Takuro Kato, Tsukuba (JP); Yukikazu Koide, Tsukuba (JP); Hironobu Okamoto, Tsukuba (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 285 days.

(21) Appl. No.: 18/157,572

(22) Filed: Jan. 20, 2023

(65) Prior Publication Data

US 2023/0242386 A1 Aug. 3, 2023

(30) Foreign Application Priority Data

Jan. 28, 2022 (JP) ................................ 2022-012313

(51) Int. Cl.
*B66F 9/16* (2006.01)
*B66F 9/075* (2006.01)
*B66F 9/12* (2006.01)
*B66F 9/22* (2006.01)

(52) U.S. Cl.
CPC ............ *B66F 9/0755* (2013.01); *B66F 9/122* (2013.01); *B66F 9/16* (2013.01); *B66F 9/22* (2013.01)

(58) Field of Classification Search
CPC ........................................................ B66F 9/16
See application file for complete search history.

(56) References Cited

U.S. PATENT DOCUMENTS

| | | | | |
|---|---|---|---|---|
| 10,640,347 | B2 * | 5/2020 | Shah | B66F 9/0755 |
| 2016/0101970 | A1 * | 4/2016 | Taki | B66F 17/003 701/50 |
| 2017/0285644 | A1 * | 10/2017 | Ichinose | B66F 9/063 |
| 2018/0105406 | A1 * | 4/2018 | Goto | B66F 9/0755 |
| 2020/0024114 | A1 * | 1/2020 | Uchimura | B66F 9/16 |

FOREIGN PATENT DOCUMENTS

| | | | |
|---|---|---|---|
| JP | 2005-008367 | A | 1/2005 |
| JP | 6436553 | B1 | 12/2018 |
| JP | 2019-137479 | A | 8/2019 |

* cited by examiner

*Primary Examiner* — Mark C Hageman
(74) *Attorney, Agent, or Firm* — Sughrue Mion, PLLC

(57) ABSTRACT

A controlling device of a forklift executes a stopping process of stopping lowering of a fork by a lift device when a detection sensor is separated from a first facing surface while the fork is being lowered by the lift device in a placing operation, a forward tilting process executed after execution of the stopping process, the forward tilting process controlling the tilt device to tilt the fork forward until the tilt angle reaches a limit value, and a returning process of sequentially obtaining values of the tilt angle during execution of the forward tilting process and tilting the fork rearward when the value of the tilt angle stops changing before the tilt angle reaches the limit value. The returning process is not executed in a case in which the tilt angle reaches the limit value.

4 Claims, 8 Drawing Sheets

FORKLIFT AND FORKLIFT CONTROLLING METHOD

BACKGROUND

1. Field

The present disclosure relates to a forklift and a forklift controlling method.

2. Description of Related Art

Japanese Patent No. 6436553 discloses a forklift that conveys a pallet mounted on forks.

If the forks contact a surface that defines an insertion opening, the forks may catch on that surface when the forks are removed from the insertion opening. Therefore, it is difficult to properly remove the forks from the insertion opening.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a forklift is provided that includes a vehicle body, a fork, a lift device, a tilt device, a tilt sensor, processing circuitry, and a selection sensor. The fork is configured to mount a pallet. An opening into which the fork is inserted when the pallet is mounted on the fork is an insertion opening. The fork includes an insertion portion that is inserted into the insertion opening. Surfaces that define the insertion opening include a first facing surface that is located above the insertion portion when the fork is inserted into the insertion opening and a second facing surface that faces the first facing surface. The lift device is configured to lift or lower the fork. The tilt device is configured to tilt the fork. The tilt sensor is configured to output a signal corresponding to a tilt angle of the fork. The processing circuitry is configured to control the lift device and the tilt device. The detection sensor is provided in the insertion portion. The detection sensor is disposed closer to a base of the insertion portion than to a distal end of the insertion portion so as to correspond to an entrance of the insertion opening when the fork is inserted into the insertion opening. The detection sensor is configured to detect whether the insertion portion is in contact with the first facing surface. The forklift is configured to perform, with the lift device, a placing operation of placing the pallet on a placement surface by lowering the fork with the pallet mounted on the fork. The processing circuitry is configured to execute a stopping process of stopping lowering of the fork by the lift device when the detection sensor is separated from the first facing surface while the fork is being lowered by the lift device in the placing operation, a forward tilting process executed after execution of the stopping process, the forward tilting process controlling the tilt device to tilt the fork forward until the tilt angle reaches a limit value, and a returning process of sequentially obtaining values of the tilt angle calculated based on a signal from the tilt sensor during execution of the forward tilting process, the returning process controlling the tilt device to tilt the fork rearward such that the insertion portion or the detection sensor is separate from the first facing surface when the value of the tilt angle stops changing before the tilt angle reaches the limit value. The returning process is not executed in a case in which the tilt angle reaches the limit value.

In another general aspect, a forklift controlling method is provided. The forklift includes a vehicle body and a fork that is configured to mount a pallet. An opening into which the fork is inserted when the pallet is mounted on the fork is an insertion opening. The fork includes an insertion portion that is inserted into the insertion opening. Surfaces that define the insertion opening include a first facing surface that is located above the insertion portion when the fork is inserted into the insertion opening and a second facing surface that faces the first facing surface. The forklift controlling method includes performing a placing operation of placing the pallet on a placement surface by lowering the fork with the pallet mounted on the fork, detecting whether the insertion portion is in contact with the first facing surface during the placing operation, executing a stopping process of stopping lowering of the fork when contact of the insertion portion with the first facing surface stops being detected while the fork is being lowered in the placing operation, executing a forward tilting process after execution of the stopping process, the forward tilting process tilting the fork forward such that a tilt angle of the fork becomes a limit value, sequentially obtaining values of the tilt angle during execution of the forward tilting process, and, during execution of the forward tilting process, executing a returning process of tilting the fork rearward when the value of the tilt angle stops changing before the tilt angle reaches the limit value, and not executing the returning process in a case in which the tilt angle reaches the limit value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A forklift 10 according to one embodiment will now be described with reference to FIGS. 1 to 17.

Configuration of Forklift

Figure 1:
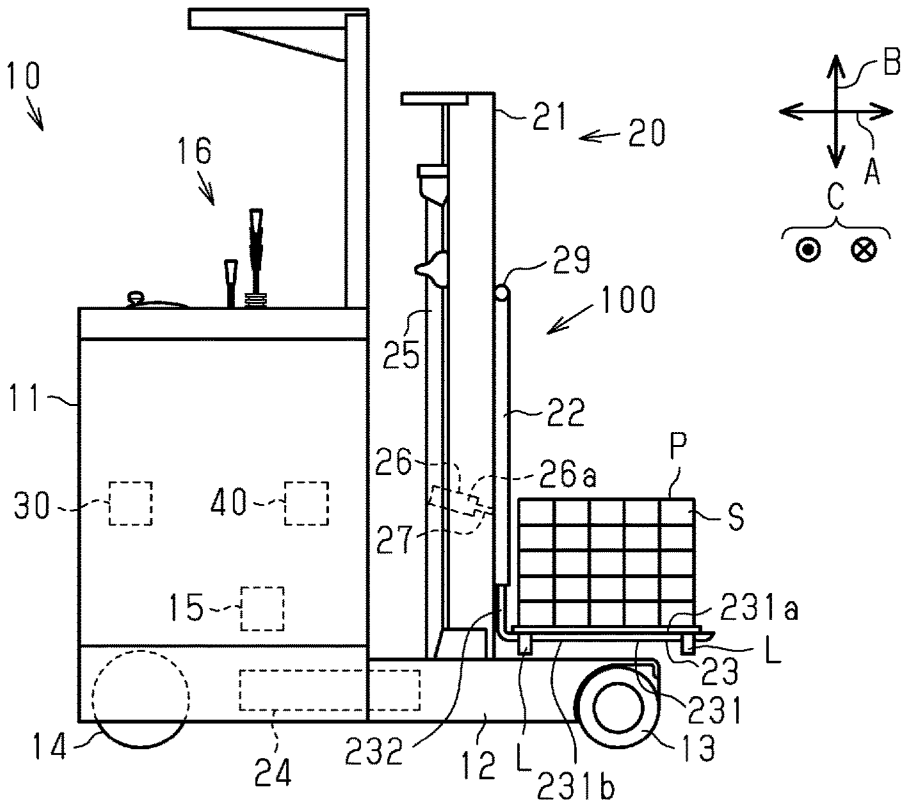
FIG. 1 is a side view of a forklift according to one embodiment.

The forklift 10, which is shown in FIG. 1, is used in sites where pallets P are conveyed, such as factories, maritime ports, and commercial facilities. The forklift 10 performs an unloading operation to mount a pallet P and then conveys the pallet P. After conveying the pallet P, the forklift 10 performs a placing operation to place the pallet P. The pallet P includes a rectangular box-shaped storing portion S, which stores a conveyed object, and legs L provided at the four corners of the storing portion S. The pallet P is a mesh pallet. The forklift 10 of the present embodiment is a reach forklift.

The forklift 10 includes a vehicle body 11, reach legs 12, front wheels 13, rear wheels 14, a traveling motor 15, a cargo handling device 20, and a controlling device 30. In the following description, a front-rear direction of the vehicle body 11 will be referred to as a first direction A, and an up-down direction of the vehicle body 11 will be referred to as a second direction B. A left-right direction of the vehicle body 11 will be referred to as a third direction C. The first direction A and the second direction B are orthogonal to each other. The first direction A and the third direction C are orthogonal to each other.

The reach legs 12 extend forward from the vehicle body 11 with respect to the vehicle body 11. The reach legs 12, of which there are two, are spaced apart from each other in the third direction C. The front wheels 13 are respectively provided in the two reach legs 12. The rear wheels 14 are provided in the vehicle body 11. The rear wheels 14 are, for example, steered wheels and driven wheels, which are driven by the traveling motor 15. When the traveling motor 15 is activated, the forklift 10 moves in the first direction A.

The cargo handling device 20 includes mast assemblies 21, a lift bracket 22, and forks 23. The cargo handling device 20 includes a reach cylinder 24, a lift cylinder 25, a tilt cylinder 26, a tilt rod 27, and a hydraulic mechanism 40.

The mast assemblies 21 are multistage mast assemblies. The mast assemblies 21, of which there are two, are spaced apart from each other in the third direction C. The mast assemblies 21 each include an outer mast, a middle mast, and an inner mast, which are slidably engaged with each other.

Figure 2:
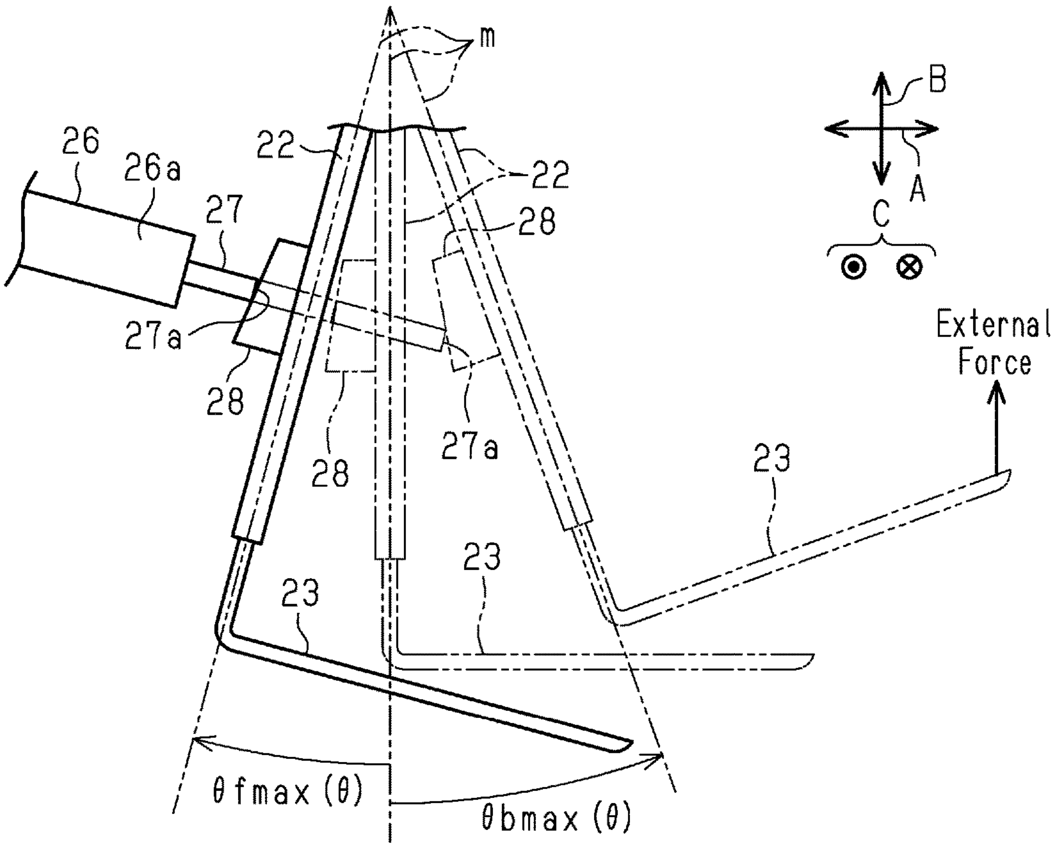
FIG. 2 is a diagram schematically showing an area including a tilt cylinder of the forklift shown in FIG. 1.

As shown in FIGS. 1 and 2, the mast assemblies 21 are provided with a carriage 100. The carriage 100 includes a lift bracket 22, forks 23, a finger bar 28, and a pivot 29. The carriage 100 is suspended from the inner masts of the mast assemblies 21 with a chain mechanism (not shown).

As shown in FIG. 1, the lift bracket 22 is suspended from the inner masts of the mast assemblies 21 with a chain mechanism (not shown). The lift bracket 22 is provided between the two mast assemblies 21 to be lifted or lowered in the second direction B. The finger bar 28 is attached to the lift bracket 22 such that the length extends in the third direction C. The forks 23, of which there are two, are spaced apart from each other in the third direction C. Each fork 23 includes a base portion 232 attached to the lift bracket 22 and an insertion portion 231 extending from a distal end of the base portion 232 in the forward direction of the vehicle body 11. The insertion portions 231 support the bottom of the storing portion S. The insertion portions 231 each have the shape of a plate. The insertion portions 231 each have a first surface 231*a* and a second surface 231*b*. The first surface 231*a* is a surface facing the bottom of the storing portion S. The second surface 231*b* is a surface that is on a side opposite to the first surface 231*a* in the thickness direction of the insertion portion 231.

The pivot 29 is provided on the lift bracket 22 such that its axis extends in the third direction C. The lift bracket 22 is pivotally supported with the pivot 29. The forks 23 and the lift bracket 22 are pivotal forward or rearward about the pivot 29 with respect to the vehicle body 11. For example, when an external force in the upward direction of the vehicle body 11 is applied to the distal ends of the insertion portions 231 as shown FIG. 2, the forks 23 and the lift bracket 22 pivot in the forward direction of the vehicle body 11 about the pivot 29.

As shown in FIG. 1, the reach cylinder 24 includes a hydraulic cylinder. Supply and drainage of hydraulic fluid to and from the reach cylinder 24 moves the mast assemblies 21 in the first direction A. The carriage 100, which includes the forks 23, moves in the first direction A together with the mast assemblies 21. An action in which the reach cylinder 24 moves the forks 23 together with the mast assemblies 21 in a forward direction of the vehicle body 11 will be referred to as "extension." An action in which the reach cylinder 24 moves the forks 23 together with the mast assemblies 21 in a rearward direction of the vehicle body 11 will be referred to as "retraction."

The lift cylinder 25 includes a hydraulic cylinder. When hydraulic fluid is supplied to or drained from the lift cylinder 25, the mast assemblies 21 are extended or retracted. Accordingly, the carriage 100 is raised or lowered in the second direction B along the mast assemblies 21. The forks 23 ascend or descent together with the lift bracket 22 in the second direction B.

The tilt cylinder 26 includes a hydraulic cylinder. The tilt cylinder 26 includes a cylinder tube 26*a* and the tilt rod 27. The tilt rod 27 is a rod that is selectively protruded from and retracted into the cylinder tube 26*a* by supply and drainage of hydraulic fluid to and from the tilt cylinder 26.

As shown in FIG. 2, the distal end 27*a* of the tilt rod 27 is configured to contact and separate from the finger bar 28. In other words, the distal end 27*a* of the tilt rod 27 is not fixed to the finger bar 28.

The forks 23 and the lift bracket 22 are tilted forward in a state in which the tilt rod 27 is retracted most into the cylinder tube 26*a*. The center of gravity of the forks 23 and the lift bracket 22 is set such that the forward tilt of the forks 23 is at a maximum in a state in which the forks 23 and the lift bracket 22 are not supported by the tilt rod 27. That is, when the tilt rod 27 is retracted into the cylinder tube 26*a* such that the distal end 27*a* separates from the finger bar 28, the forks 23 tilts forward under its own weight.

The tilt rod 27 is protruded from the cylinder tube 26*a* by supply of hydraulic fluid to the tilt cylinder 26. When the tilt rod 27 is protruded from the cylinder tube 26*a* so that the distal end 27*a* of the tilt rod 27 pushes the finger bar 28, the forks 23 tilt rearward together with the lift bracket 22 and the finger bar 28. The rearward tilt of the forks 23 is at a maximum when the tilt rod 27 protrudes maximally from the cylinder tube 26*a*.

The forks 23 thus tilt when hydraulic fluid is supplied to or drained from the tilt cylinder 26. The forks 23 tilt together with the finger bar 28 and the lift bracket 22. Tilting includes forward tilting and rearward tilting. Forward tilting refers to an action in which the forks 23, the lift bracket 22, and the finger bar 28 tilt in the forward direction of the vehicle body 11 (the distal ends of the forks 23 are lowered). Rearward tilting refers to an action in which the forks 23, the lift bracket 22, and the finger bar 28 tilt in the rearward direction of the vehicle body 11 (the distal ends of the forks 23 are raised). The forks 23 are raised, lowered, tilted forward, and tilted rearward together with the lift bracket 22 and the finger bar 28. The lift bracket 22 and the finger bar 28 thus form an attachment portion that is displaced integrally with the forks 23. The forks 23 are attached to the attachment portion.

In a state in which the insertion portions 231 of the forks 23 extend in the first direction A, an imaginary line that is orthogonal to the first surfaces 231*a* of the insertion portions 231 and extends along the base portions 232 is defined as a reference line m of the forks 23. A state in which the first surfaces 231*a* of the insertion portions 231 are horizontal is referred to as a reference state. A tilt angle θ of the forks 23 is an angle between the reference line m when the forks 23 are tilted forward and the reference line m in the reference state.

The lower limit value of the tilt angle θ is defined as a limit value θfmax. The limit value θfmax is the angle between the reference line m in the reference state and the reference line m in a state in which the forward tilt of the forks 23 is at a maximum. The limit value θfmax is a negative value.

The upper limit value of the tilt angle θ is defined as a limit value θbmax. The limit value θbmax is the angle between the reference line m in the reference state and the reference line m in a state in which the rearward tilt of the forks 23 is at a maximum. The limit value θbmax is a positive value.

Figure 3:
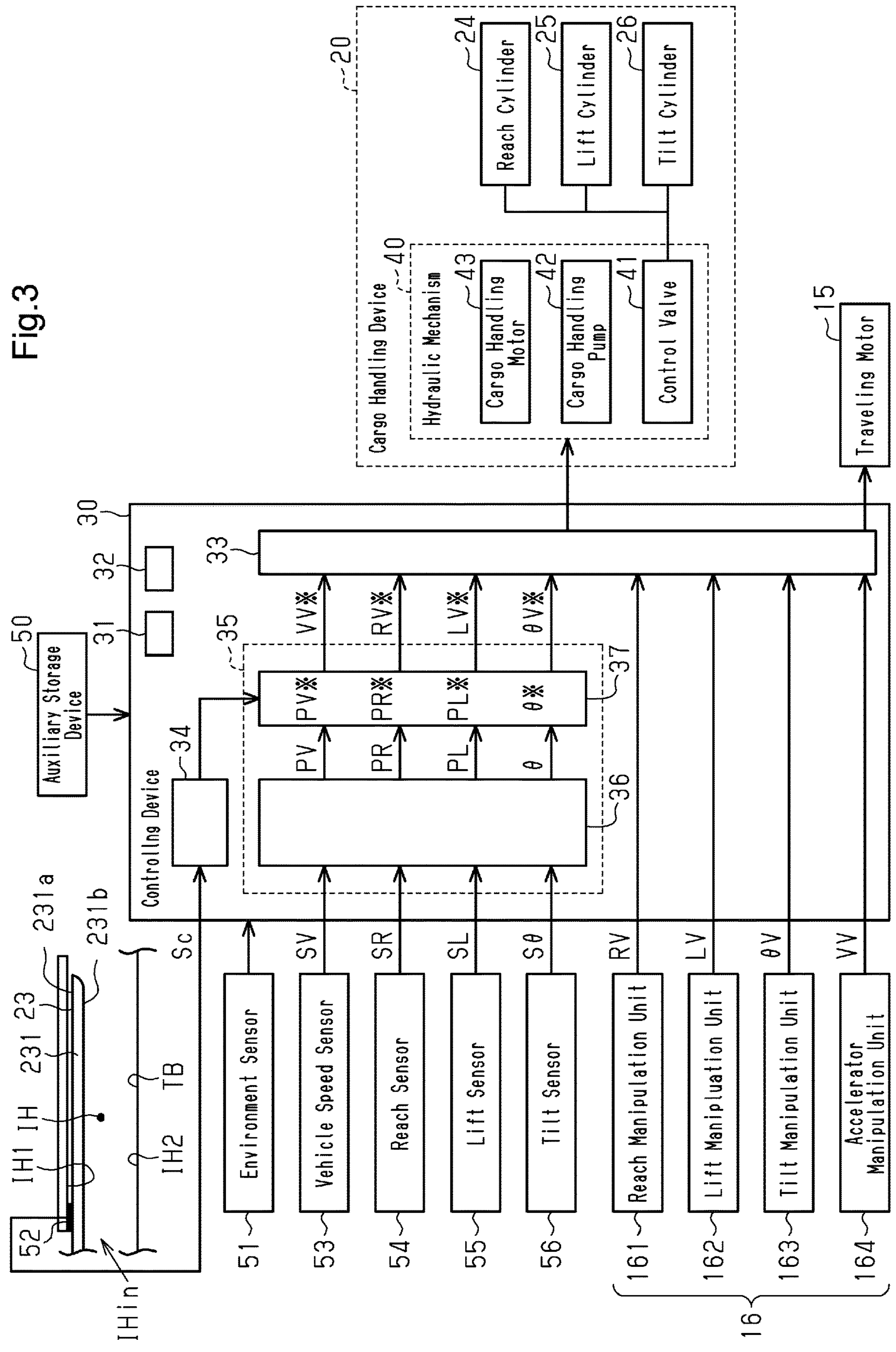
FIG. 3 is a block diagram showing the configuration of the forklift shown in FIG. 1.

As shown in FIG. 3, the hydraulic mechanism 40 is configured to control supply of hydraulic fluid to, and drainage of hydraulic fluid from, hydraulic machines including the reach cylinder 24, the lift cylinder 25, and the tilt cylinder 26. The hydraulic mechanism 40 includes a control valve 41, a cargo handling pump 42, and a cargo handling motor 43. The control valve 41 controls supply of hydraulic fluid to, and drainage of hydraulic fluid from, the reach cylinder 24, the lift cylinder 25, and the tilt cylinder 26. The control valve 41 includes an electromagnetic control valve that regulates the opening degrees of oil passages that supply and drain hydraulic fluid to and from the reach cylinder 24, the lift cylinder 25, and the tilt cylinder 26. The cargo handling pump 42 discharges hydraulic fluid to the control valve 41. The cargo handling motor 43 generates driving force that drives the cargo handling pump 42.

As shown in FIG. 1, the, the reach cylinder 24 and the hydraulic mechanism 40 operate as an example of a moving device, which moves the forks 23 forward and rearward in the first direction A. The lift cylinder 25 and the hydraulic mechanism 40 operate as an example of a lift device, which lifts or lowers the forks 23 in the second direction B. The tilt cylinder 26 and the hydraulic mechanism 40 operate as an example of a tilt device, which tilts the forks 23.

Figure 4:
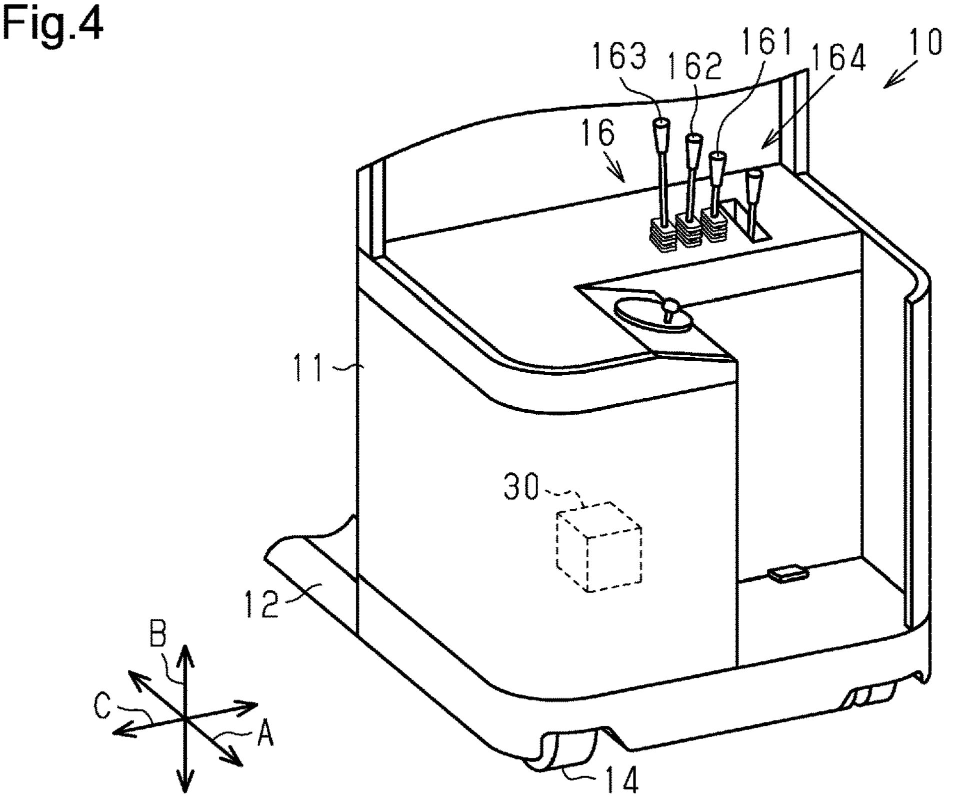
FIG. 4 is a perspective view of the forklift shown in FIG. 1.

As shown in FIG. 4, the forklift 10 includes a manipulation portion 16, which is manipulated by an operator of the forklift 10. The manipulation portion 16 includes a reach manipulation unit 161, a lift manipulation unit 162, a tilt manipulation unit 163, and an accelerator manipulation unit 164.

The reach manipulation unit 161 includes a reach lever, which is tilted forward or rearward in the first direction A from a neutral position. When the reach lever is tilted forward with respect to the vehicle body 11 from the neutral position, the reach manipulation unit 161 outputs a signal to the controlling device 30. When that signal is output, the forks 23 are moved forward with respect to the vehicle body 11 together with the mast assemblies 21. When the reach lever is tilted rearward with respect to the vehicle body 11 from the neutral position, the reach manipulation unit 161 outputs a signal to the controlling device 30. When that signal is output, the forks 23 are moved rearward with respect to the vehicle body 11 together with the mast assemblies 21.

The lift manipulation unit 162 includes a lift lever, which is tilted forward or rearward from a neutral position in the first direction A from a neutral position. When the lift lever is tilted forward with respect to the vehicle body 11 from the neutral position, the lift manipulation unit 162 outputs a signal to the controlling device 30. When that signal is output, the forks 23 are lowered together with the lift bracket 22. When the lift lever is tilted rearward with respect to the vehicle body 11 from the neutral position, the lift manipulation unit 162 outputs a signal to the controlling device 30. When that signal is output, the forks 23 are lifted together with the lift bracket 22.

The tilt manipulation unit 163 includes a tilt lever, which is tilted forward or rearward in the first direction A from a neutral position. When the tilt lever is tilted forward with respect to the vehicle body 11 from the neutral position, the tilt manipulation unit 163 outputs a signal to the controlling device 30. When that signal is output, the tilt rod 27 is retracted into the cylinder tube 26*a*, so that the forks 23 tilt forward together with the lift bracket 22 and the finger bar 28. When the tilt lever is tilted rearward with respect to the vehicle body 11 from the neutral position, the tilt manipulation unit 163 outputs a signal to the controlling device 30.

When that signal is output, the tilt rod 27 protrudes from the cylinder tube 26*a*, so that the forks 23 tilt rearward together with the lift bracket 22 and the finger bar 28.

The accelerator manipulation unit 164 includes an acceleration lever, which is tilted forward or rearward from a neutral position in the first direction A. When the acceleration lever is tilted forward with respect to the vehicle body 11 from the neutral position, the accelerator manipulation unit 164 outputs a signal to the controlling device 30. When that signal is output, the traveling motor 15 is driven to cause the forklift 10 to advance. When the acceleration lever is tilted rearward with respect to the vehicle body 11 from the neutral position, the accelerator manipulation unit 164 outputs a signal to the controlling device 30. When that signal is output, the traveling motor 15 is driven to cause the forklift 10 to reverse.

Figure 5:
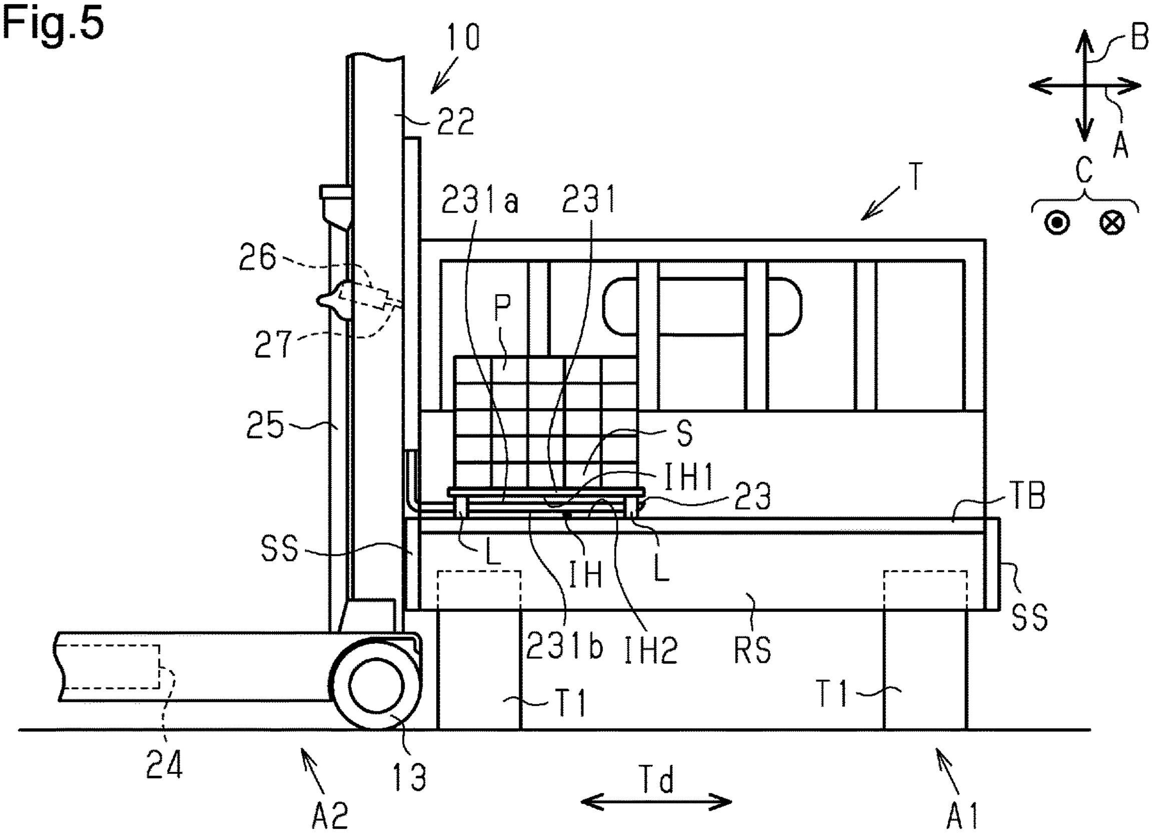
FIG. 5 is a diagram schematically showing a placing operation performed by the forklift shown in FIG. 1.

As shown in FIG. 5, the forklift 10 performs an unloading operation of a pallet P mounted on the truck T. A parking position A1 of the truck T is determined in advance. After moving to an unloading position A2, the forklift 10 performs the unloading operation.

The forklift 10 performs a placing operation of placing the pallet P on a placement surface TB of the truck T by lowering the forks 23 with the pallet P mounted on the fork 23. The forklift 10 performs the placing operation at the same position as the unloading position A2, for example.

The truck T includes the placement surface TB, side gates SS, a tail gate RS, and tires T1. The pallet P is mounted on the placement surface TB. The side gates SS are provided on the sides of the placement surface TB. The side gates SS can be swung upward or downward with respect to the truck T. The tail gate RS is provided in a rear part of the placement surface TB. The tail gate RS can be swung upward or downward with respect to the truck T. The side gates SS and the tail gate RS surround the placement surface TB, for example, when the truck T is traveling. When the forklift 10 performs the unloading operation or the placing operation, the side gates SS and the tail gate RS have been pivoted downward, so that the side gates SS and the tail gate RS do not face the pallets P. That is, when the forklift 10 performs the unloading operation or the placing operation, the side gates SS and the tail gate RS are pivoted so as not to hinder the unloading operation or the placing operation by the forklift 10. When conveying the pallet P after the unloading operation, the forklift 10 sets the forks 23 in a horizontal state or in a state in which the forks 23 are tilted rearward. Then, the forklift 10 performs the placing operation while maintaining the tilt of the forks 23 at the time when the pallet P is being conveyed. FIG. 5 illustrates an example in which the placing operation is performed when the forks 23 are in a horizontal state.

When the pallet P is placed on the placement surface TB, an insertion opening IH is defined by the placement surface TB, the legs L, and the storing portion S. The forks 23 are inserted into the insertion opening IH in order to mount the pallet P on the forks 23 of the forklift 10. The insertion portions 231 of the forks 23 are inserted into the insertion opening IH. The forklift 10 performs the unloading operation and the placing operation on the side facing a side gate SS of the truck T. That is, the unloading operation and the placing operation are performed in a state in which the first direction A of the forklift 10 and a vehicle width direction Td of the truck T agree with each other.

The surfaces that define the insertion opening IH include a first facing surface IH1 and a second facing surface IH2. The first facing surface IH1 faces the first surfaces 231*a* of the insertion portions 231 in a state in which the insertion portions 231 are inserted into the insertion opening IH. The first facing surface IH1, which is one of the surfaces that define the insertion opening IH, is a surface located above the second facing surface IH2. When the forks 23 are inserted into the insertion opening IH, the first facing surface IH1 is located above the insertion portions 231. The second facing surface IH2 faces the second surfaces 231*b* of the insertion portions 231 in a state in which the insertion portions 231 are inserted into the insertion opening IH. The second facing surface IH2, which is one of the surfaces that define the insertion opening IH, is a surface that faces the first facing surface IH1.

As shown in FIG. 3, the forklift 10 includes an auxiliary storage device 50 and an environment sensor 51. The forklift 10 also includes a detection sensor 52, a vehicle speed sensor 53, a reach sensor 54, a lift sensor 55, and a tilt sensor 56.

The auxiliary storage device 50 stores information that can be read by the controlling device 30. The auxiliary storage device 50 may be a hard disk drive or a solid state drive. The auxiliary storage device 50 stores map information. The map information includes information related to physical structure of the environment surrounding the forklift 10, such as the shape and the size of the environment in which the forklift 10 is used. Positions such as the parking position A1 and the unloading position A2 are expressed as coordinates in the map information. The map information is data that uses coordinates to express the environment in which the forklift 10 is used. The map information may be stored in the auxiliary storage device 50 in advance if the surrounding environment in which the forklift 10 is used is known in advance. If the map information is stored in the auxiliary storage device 50 in advance, the coordinates of structures of which the positions experience relatively little change are stored as the map information. The map information may be generated by simultaneous localization and mapping (SLAM). Mapping is performed by forming local maps from coordinates acquired by the environment sensor 51, and combining the local maps together in accordance with the self-position of the forklift 10. The environment sensor 51 allows the controlling device 30 to recognize relative positions of the forklift 10 and objects behind the forklift 10. The environment sensor 51 may include a millimeter wave radar, a stereo camera, or a laser imaging detection and ranging (LIDAR) sensor.

The detection sensor 52 is provided in one of the insertion portions 231. The detection sensor 52 is disposed closer to the base of the insertion portion 231 (closer to the base portion 232) than to the distal end of the insertion portion 231 so as to correspond to an entrance IHin of the insertion opening IH when the forks 23 are inserted into the insertion opening IH. The detection sensor 52 may be provided on the upper surface of the insertion portion 231. The detection sensor 52 is provided at a position that corresponds to the entrance IHin of the insertion opening IH in a state in which the insertion portion 231 is inserted into the insertion opening IH. For example, the detection sensor 52 is provided at a position that intersects with the plane of the opening of the entrance IHin or is close to the entrance IHin. The detection sensor 52 is a contact sensor that outputs a signal Sc to the controlling device 30 when in contact with the first facing surface IH1 and does not output the signal Sc to the controlling device 30 when separated from the first facing surface IH1. The detection sensor 52 is a sensor that detects whether the insertion portion 231 is in contact with the first facing surface IH1. The detection sensor 52 may be a contact sensor that does not output the signal Sc to the controlling device 30 when in contact with the first facing surface IH1 and outputs the signal Sc to the controlling device 30 when separated from the first facing surface IH1. The detection sensor 52 may be a load sensor. That is, the detection sensor 52 may be any sensor as long as it detects whether the insertion portion 231 is in contact with the first facing surface IH1. The thickness of the detection sensor 52 illustrated in FIG. 3 is exaggerated. For illustrative purposes, the insertion portion 231 does not appear to be in contact with the first facing surface IH1 in FIG. 3, in which the detection sensor 52 is in contact with the first facing surface IH1. However, in reality, the insertion portion 231 is in contact with the first facing surface IH1 when the detection sensor 52 is in contact with the first facing surface IH1.

The vehicle speed sensor 53 outputs a signal SV to the controlling device 30. The reach sensor 54 outputs a signal SR to the controlling device 30. The lift sensor 55 outputs a signal SL to the controlling device 30. The tilt sensor 56 outputs a signal Sθ to the controlling device 30 at specified intervals at least while the forks 23 are tilted.

Configuration of Controlling Device

As shown in FIG. 3, the controlling device 30 includes a processor 31, such as a CPU and a GPU, and a storage unit 32, which includes RAM and ROM. The storage unit 32 stores program codes or commands configured to cause the processor 31 to execute processes. The storage unit 32, which is a computer-readable medium, includes any type of medium that is accessible by a general-purpose computer or a dedicated computer. The controlling device 30 may include a hardware circuit such as an application specific integrated circuit (ASIC) and a field programmable gate array (FPGA). The controlling device 30, which is processing circuitry, may include one or more processors that operate according to a computer program, one or more hardware circuits such as an ASIC and an FPGA, or a combination thereof. Program codes or commands stored in the storage unit 32 may be stored in the auxiliary storage device 50 in place of the storage unit 32.

The controlling device 30 controls the traveling motor 15 and the hydraulic mechanism 40 in accordance with program codes or commands stored in the storage unit 32. This causes the forklift 10 to travel, and the reach cylinder 24, the lift cylinder 25, and the tilt cylinder 26 to operate. In other words, the controlling device 30 controls the moving device, the lift device, and the tilt device. Normally, the forklift 10 of the present embodiment is not operated by an operator. The forklift 10 is an unmanned forklift that operates automatically through control of the moving device, the lift device, and the tilt device by the controlling device 30. The forklift 10 of the present embodiment can also be used as a manned forklift that operates in response to manipulation of the manipulation portion 16 performed by an operator.

The controlling device 30 executes a self-position estimation process. The self-position estimation process is a process that estimates the self-position of the forklift 10 on the map information stored in the auxiliary storage device 50. The controlling device 30 controls the traveling motor 15 while executing the self-position estimation process, thereby moving the forklift 10 to the unloading position A2. The self-position estimation process may be executed through odometry, which estimates the movement amount using the number of rotations of the traveling motor 15. Alternatively, the self-position estimation process may be executed based on results of matching between landmarks and the map information. Further, these two methods may be combined to execute the self-position estimation process. If the forklift 10 is used outdoors, the self-position may be estimated using the global positioning system (GPS). The self-position refers to a coordinate that represents a point in the vehicle body 11, for example, the coordinate of the center in the horizontal direction of the vehicle body 11.

When the forklift 10 reaches the unloading position A2, the controlling device 30 controls the hydraulic mechanism 40 to adjust the height of the forks 23 so that the distal ends of the insertion portions 231 face the insertion opening IH. The controlling device 30 moves the forks 23 in the forward direction of the vehicle body 11 by controlling the hydraulic mechanism 40 to extend the mast assemblies 21. This inserts the insertion portions 231 into the insertion opening IH. After the insertion portions 231 are inserted into the insertion opening IH, the controlling device 30 controls the hydraulic mechanism 40 to raise the forks 23, thereby mounting the pallet P on the forks 23. After the pallet P is mounted on the forks 23, the controlling device 30 moves the forks 23 in the rear direction of the vehicle body 11 by controlling the hydraulic mechanism 40 to retract the mast assemblies 21. The controlling device 30 thus automatically performs the unloading operation. When the pallet P is mounted on the forks 23 in the unloading operation, the detection sensor 52 is in contact with the first facing surface IH1. When the pallet P is mounted on the forks 23 in the unloading operation, the controlling device 30 controls the hydraulic mechanism 40 so that the forks 23 are horizontal or tilted rearward.

The controlling device 30 moves the forklift 10 to the unloading position A2 even when performing the placing operation. After the forklift 10 moves to the unloading position A2, the controlling device 30 controls the hydraulic mechanism 40 to extend the mast assemblies 21 so that the forks 23 are disposed directly above the placement surface TB of the truck T. The controlling device 30 lowers the forks 23 by controlling the hydraulic mechanism 40 in a state in which the forks 23 are directly above the placement surface TB. The pallet P is thus placed on the placement surface TB. The controlling device 30 thus automatically performs the placing operation. The placing operation is an operation of placing the pallet P on the placement surface TB by lowering the forks 23 by the lift device in a state in which the pallet P is mounted on the forks 23.

Contact Determining Unit and Estimated Voltage Value Calculating Unit

The controlling device 30 includes a contact determining unit 34 and an estimated voltage value calculating unit 35.

The signal Sc from the detection sensor 52 is input to the contact determining unit 34. When the signal Sc is input to the contact determining unit 34, the contact determining unit 34 determines that the insertion portions 231 are in contact with the first facing surface IH1. When the signal Sc is not input to the contact determining unit 34, the contact determining unit 34 determines that the insertion portions 231 are not in contact with the first facing surface IH1. The contact determining unit 34 outputs the determination result to the estimated voltage value calculating unit 35.

The estimated voltage value calculating unit 35 includes a position calculating unit 36 and a target position calculating unit 37. The signals SV, SR, SL, and Sθ are input to the position calculating unit 36.

The position calculating unit 36 calculates the vehicle speed of the forklift 10 based on the signal SV, and calculates the movement amount PV of the forklift 10 based on the vehicle speed. The vehicle speed sensor 53 outputs the signal SV, which corresponds to the vehicle speed of the forklift 10. The position calculating unit 36 outputs a calculated movement amount PV to the target position calculating unit 37.

The position calculating unit 36 calculates a movement amount PR of the mast assemblies 21 based on the signal SR. The reach sensor 54 outputs the signal SR, which corresponds to the movement amount PR of the mast assemblies 21 by the reach cylinder 24. The position calculating unit 36 outputs the calculated movement amount PR to the target position calculating unit 37.

The position calculating unit 36 calculates a height PL of the forks 23 based on the signal SL. The lift sensor 55 outputs the signal SL, which corresponds to the height PL of the forks 23, which have been lifted or lowered by the lift cylinder 25. The position calculating unit 36 outputs the calculated height PL to the target position calculating unit 37.

The position calculating unit 36 calculates the tilt angle θ of the forks 23 based on the signal Sθ. The tilt sensor 56 outputs the signal Sθ, which corresponds to the tilt angle θ of the forks 23 tilted by the tilt cylinder 26, at specified intervals. The position calculating unit 36 sequentially outputs calculated values of the tilt angle θ to the target position calculating unit 37.

The determination result of the contact determining unit 34 and the movement amount PV, the movement amount PR, the height PL, and the tilt angle θ output from the position calculating unit 36 are input to the target position calculating unit 37.

The target position calculating unit 37 calculates a target vehicle position PV*. The target vehicle position PV* is calculated based on the input movement amount PV. The target vehicle position PV* represents a target position in the first direction A at which the forklift 10 should be. The target position calculating unit 37 calculates a voltage value VV*. The voltage value VV* is an estimated value of a voltage value VV of a signal that is output from the accelerator manipulation unit 164 if the accelerator manipulation unit 164 is manipulated to achieve the target vehicle position PV*.

The target position calculating unit 37 calculates a target mast position PR*. The target mast position PR* is calculated based on the input movement amount PR. The target mast position PR* represents a target position in the first direction A at which the mast assemblies 21 should be. The target position calculating unit 37 calculates a voltage value RV*. The voltage value RV* is an estimated value of a voltage value RV of a signal that is output from the reach manipulation unit 161 if the reach manipulation unit 161 is manipulated to achieve the target mast position PR*.

The target position calculating unit 37 calculates a target fork height PL*. The target fork height PL* is calculated based on the input determination result and the height PL. The target fork height PL* represents a target position in the second direction B at which the forks 23 should be. The target position calculating unit 37 calculates a voltage value LV*. The voltage value LV* is an estimated value of a voltage value LV of a signal that is output from the lift manipulation unit 162 if the lift manipulation unit 162 is manipulated to achieve the target fork height PL*.

When the determination result indicating that the insertion portions 231 are in contact with the first facing surface IH1 is input to the target position calculating unit 37, the target position calculating unit 37 calculates the target fork height PL* based on the input height PL. The insertion portions 231 being in contact with the first facing surface IH1 is synonymous with the detection sensor 52 being in contact with the first facing surface IH1.

When the determination result indicating that the insertion portions 231 are not in contact with the first facing surface IH1 is input to the target position calculating unit 37, the target position calculating unit 37 calculates the voltage value LV* so as to lower the forks 23. When the insertion portions 231 are not in contact with the first facing surface IH1, the target position calculating unit 37 replaces the voltage value LV* with the voltage value LV that corresponds to a state in which the lift manipulation unit 162 is not manipulated. Therefore, when the insertion portions 231 are not in contact with the first facing surface IH1, the target position calculating unit 37 calculates the voltage value LV* at which the operation of the forks 23 is stopped, assuming that the lift manipulation unit 162 is not being manipulated. The insertion portions 231 not being in contact with the first facing surface IH1 is synonymous with the detection sensor 52 being separate from the first facing surface IH1.

The target position calculating unit 37 monitors changes in the tilt angle θ, which is input to the target position calculating unit 37. The target position calculating unit 37 calculates a target tilt angle θ*. The target tilt angle θ* is calculated based on the input tilt angle θ. The target tilt angle θ* is a target tilt angle θ to which the forks 23 should be tilted. The target position calculating unit 37 calculates a voltage value θV*. The voltage value θV* is an estimated value of a voltage value θv of a signal that is output from the tilt manipulation unit 163 if the tilt manipulation unit 163 is manipulated to achieve the target tilt angle θ*. The estimated voltage value calculating unit 35 calculates the voltage values VV*, RV*, LV*, and θV* for estimating manipulation of the manipulation portion 16 when the forklift 10 operates automatically.

Internal Controller

The controlling device 30 includes an internal controller 33. The internal controller 33 calculates command values for operating each of the traveling motor 15 and the hydraulic mechanism 40.

When an operator is on the forklift 10, the voltage value RV of a signal from the reach manipulation unit 161 and the voltage value LV of a signal from the lift manipulation unit 162 are input to the internal controller 33. When an operator is on the forklift 10, the voltage value θV of a signal from the tilt manipulation unit 163 and the voltage value VV of a signal from the accelerator manipulation unit 164 are input to the internal controller 33. The internal controller 33 outputs, to the hydraulic mechanism 40, a command value for operating the hydraulic mechanism 40 based on the voltage values RV, LV, and θV. The internal controller 33 outputs, to the traveling motor 15, a command value for operating the traveling motor 15 based on the voltage value VV.

When no operator is on the forklift 10, the target position calculating unit 37 outputs the calculated voltage values VV*, RV*, LV*, and θV* to the internal controller 33. When no operator is on the forklift 10, the internal controller 33 outputs, to the hydraulic mechanism 40, a command value for operating the hydraulic mechanism 40 based on the voltage values RV*, LV*, and θV*. When no operator is on the forklift 10, the internal controller 33 outputs, to the traveling motor 15, a command value for operating the traveling motor 15 based on the voltage value VV*.

Process of Properly Removing Forks from Insertion Opening

The controlling device 30 executes a process of properly removing the forks 23 from the insertion opening IH. The process of properly removing the forks 23 from the insertion opening IH is started when the forks 23 are lowered in the placing operation.

Figure 6:
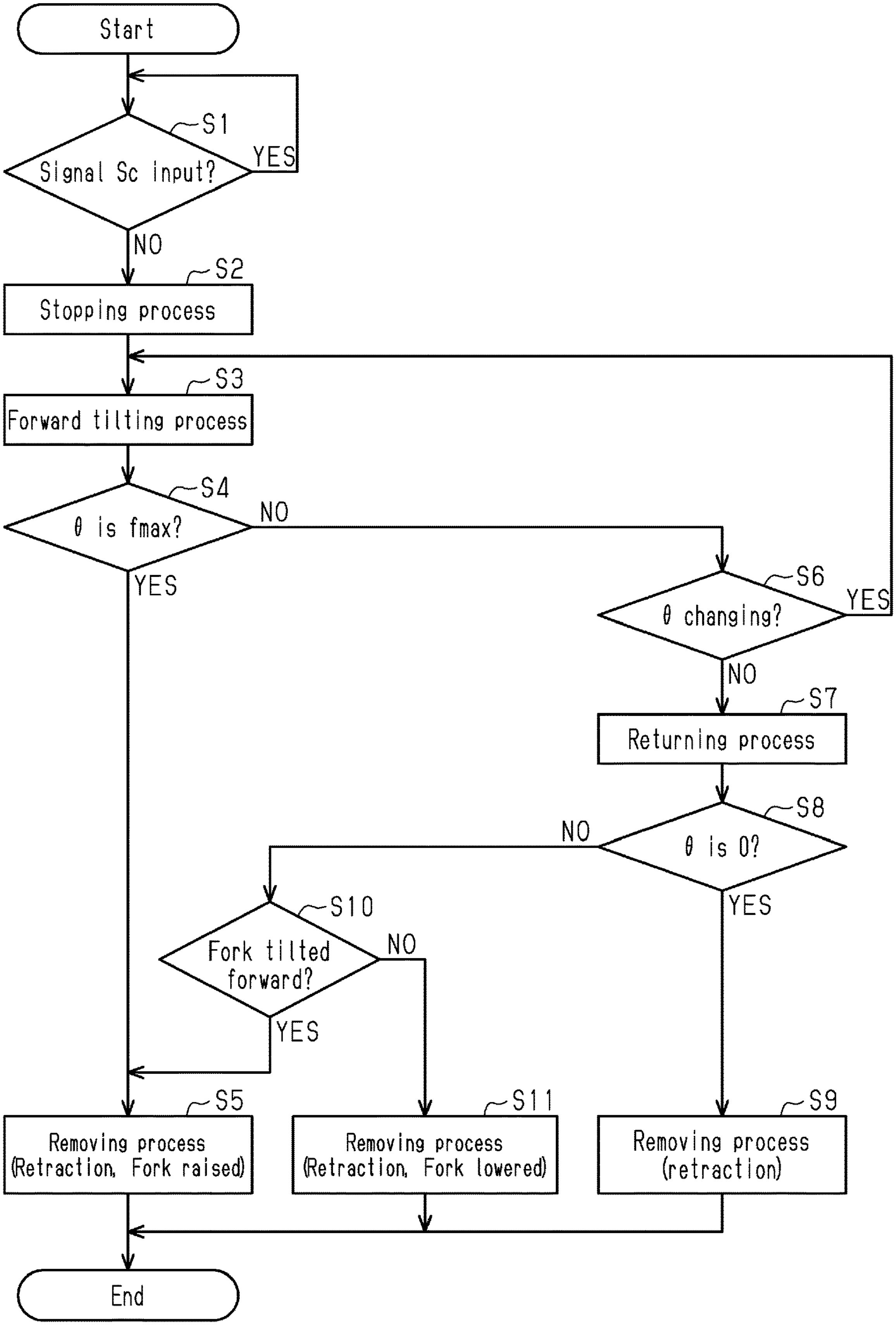
FIG. 6 is a flowchart showing a process flow executed by a controlling device of the forklift shown in FIG. 1.

As shown in FIG. 6, when the controlling device 30 starts the process of properly removing the forks 23 from the insertion opening IH, the controlling device 30 first executes step S1.

In the process of step S1, the controlling device 30 determines whether the signal Sc from the detection sensor 52 has been input. The process of step S1 is executed by the contact determining unit 34. When the contact determining unit 34 determines that the signal Sc has been input (step S1: YES), the controlling device 30 repeats the process of step S1. That is, when the contact determining unit 34 determines that the insertion portions 231 are in contact with the first facing surface IH1, the controlling device 30 repeats the process of step S1. When the contact determining unit 34 determines that the signal Sc has not been input (step S1: NO), the controlling device 30 advances the process to step S2. That is, when the contact determining unit 34 determines that the insertion portions 231 are separated from the first facing surface IH1, the controlling device 30 advances the process to step S2.

In step S2, the controlling device 30 executes a stopping process. Hereinafter, step S2 will be referred to as a stopping process S2. The stopping process S2 is a process of stopping lowering of the forks 23 by the lift device when the detection sensor 52 is separated from the first facing surface IH1 during the lowering of the forks 23 by the lift device during the placing operation. The stopping process S2 is a process of causing the target position calculating unit 37 to calculate the voltage value LV* for stopping lowering of the forks 23. The stopping process S2 is a process in which, when the detection sensor 52 is separated from the first facing surface IH1, the target position calculating unit 37 replaces the voltage value LV* with the voltage value LV that corresponds to a state in which the lift manipulation unit 162 is not manipulated. After executing the stopping process S2, the controlling device 30 advances the process to step S3.

In the process of step S3, the controlling device 30 executes a forward tilting process. Hereinafter, step S3 will be referred to as a forward tilting process S3. The forward tilting process S3 is executed after the stopping process S2. The forward tilting process S3 is a process of controlling the tilt device to tilt the forks 23 until the tilt angle θ of the forks 23 reaches the limit value θfmax. The forward tilting process S3 is a process of replacing the target tilt angle θ* calculated by the target position calculating unit 37 with the limit value θfmax. In the forward tilting process S3, the controlling device 30 calculates the voltage value θV* based on the target tilt angle θ*, which has been replaced with the limit value θfmax by the target position calculating unit 37. In the forward tilting process S3, the controlling device 30 outputs, from the internal controller 33 to the hydraulic mechanism 40, a command value that corresponds to the voltage value θV*, which has been calculated based on the target tilt angle θ* replaced with the limit value θfmax.

When the forward tilting process S3 is being executed, the target position calculating unit 37 replaces the voltage value LV* with the voltage value LV that corresponds to a state in which the lift manipulation unit 162 is not manipulated. Also, when the forward tilting process S3 is being executed, the target position calculating unit 37 replaces the voltage value RV* with the voltage value RV that corresponds to a state in which the reach manipulation unit 161 is not manipulated. Further, when the forward tilting process S3 is being executed, the target position calculating unit 37 replaces the voltage value VV* with the voltage value VV that corresponds to a state in which the accelerator manipulation unit 164 is not manipulated. In the forward tilting process S3, the controlling device 30 controls only the tilt device. After executing the forward tilting process S3, the controlling device 30 advances the process to step S4.

In the process of step S4, the controlling device 30 determines whether the tilt angle θ has reached the limit value θfmax. In the process of step S4, the target position calculating unit 37 determines whether the tilt angle θ has reached the limit value θfmax. The controlling device 30 continues the forward tilting process S3 when executing the process of step S4. When determining that the tilt angle θ has not reached the limit value θfmax in the process of step S4 (step S4: NO), the controlling device 30 advances the process to step S6.

In the process of step S6, the controlling device 30 determines whether the sequentially obtained values of the tilt angle θ have changed. The controlling device 30 continues the forward tilting process S3 when executing the process of step S6. In the process of step S6, when the target position calculating unit 37 determines that the tilt angle θ has not changed (step S6: NO), the controlling device 30 advances the process to step S7. That is, the controlling device 30 advances the process to step S7 when the value of the tilt angle θ, which has been obtained before the tilt angle θ reaches the limit value θfmax during the execution of the forward tilting process S3, stops changing.

When determining in the process of step S6 that the tilt angle θ has changed (step S6: YES), the controlling device 30 continues the forward tilting process S3. The case in which no change in the tilt angle θ is detected before the tilt angle θ reaches the limit value θfmax during the execution of the forward tilting process S3 is a case in which the distal ends of the insertion portions 231 of the forks 23 catch on the second facing surface IH2 of the insertion opening IH when the tilt rod 27 is being retracted into the cylinder tube 26*a*.

When determining that the tilt angle θ has reached the limit value θfmax in the process of step S4 (step S4: YES), the controlling device 30 advances the process to step S5. The controlling device 30 thus does not execute the process of step S7 in a case in which the tilt angle θ has reached the limit value θfmax.

In the process of step S7, the controlling device 30 executes a returning process. Hereinafter, step S7 will be referred to as a returning process S7. The returning process S7 is a process of tilting the forks 23 rearward by a specified angle by controlling the tilt device. The specified angle is stored, for example, in the storage unit 32 of the controlling device 30. In the returning process S7, the target position calculating unit 37 refers to the specified angle stored in the storage unit 32. In the returning process S7, the target position calculating unit 37 replaces the input target tilt angle θ* with the specified angle. In the returning process S7, the controlling device 30 calculates the voltage value θV* based on the target tilt angle θ* replaced with the specified angle by the target position calculating unit 37. When the returning process S7 is being executed, the target position calculating unit 37 replaces the voltage value LV* with the voltage value LV that corresponds to a state in which the lift manipulation unit 162 is not manipulated. Also, when the returning process S7 is being executed, the target position calculating unit 37 replaces the voltage value RV* with the voltage value RV that corresponds to a state in which the reach manipulation unit 161 is not manipulated. Further, when the returning process S7 is being executed, the target position calculating unit 37 replaces the voltage value VV* with the voltage value VV that corresponds to a state in which the accelerator manipulation unit 164 is not manipulated. That is, in the returning process S7, the controlling device 30 controls only the tilt device. After executing the returning process S7, the controlling device 30 advances the process to step S8.

In the process of step S8, the controlling device 30 determines whether the tilt angle θ is 0. That is, the controlling device 30 determines whether the insertion portions 231 of the forks 23 are horizontal in the process of step S8. When determining that the tilt angle θ input to the target position calculating unit 37 is 0 (step S8: YES), the controlling device 30 advances the process to step S9. When determining that the tilt angle θ input to the target position calculating unit 37 is not 0 in the process of step S8 (step S8: NO), the controlling device 30 advances the process to step S10.

In the process of step S10, the controlling device 30 determines whether the forks 23 are tilted forward. In the process of step S10, the target position calculating unit 37 determines whether the tilt angle θ is a value less than 0. In the process of step S10, the controlling device 30 determines that the forks 23 are tilted forward when the tilt angle θ is less than 0. In the process of step S10, the controlling device 30 determines that the forks 23 are not tilted forward when the tilt angle θ is greater than 0. In other words, in the process of step S10, the controlling device 30 determines that the forks 23 are tilted rearward when the tilt angle θ is greater than 0. When determining that the forks 23 are tilted forward in step S10 (step S10: YES), the controlling device 30 advances the process to step S5. When determining that the forks 23 are not tilted forward in step S10 (step S10: NO), the controlling device 30 advances the process to step S11.

In the processes of steps S5, S9, and S11, the controlling device 30 executes a removing process of removing the insertion portions 231 of the forks 23 from the insertion opening IH. Hereinafter, steps S5, S9, and S11 will be referred to as a removing processes S5, S9, and S11. After executing the removing process S5, S9, or S11, the controlling device 30 ends the process of properly removing the forks 23 from the insertion opening IH. The removing processes S5, S9, and S11 will be described in detail below.

Figure 7:
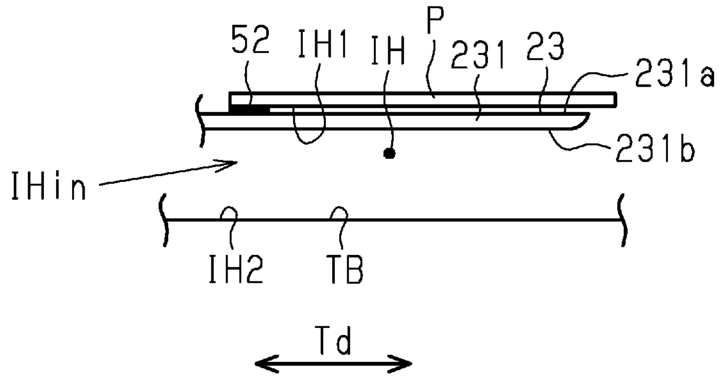
FIG. 7 is a diagram illustrating a state in which the forks are horizontal and a placement surface is horizontal during the placing operation.
Figure 8:
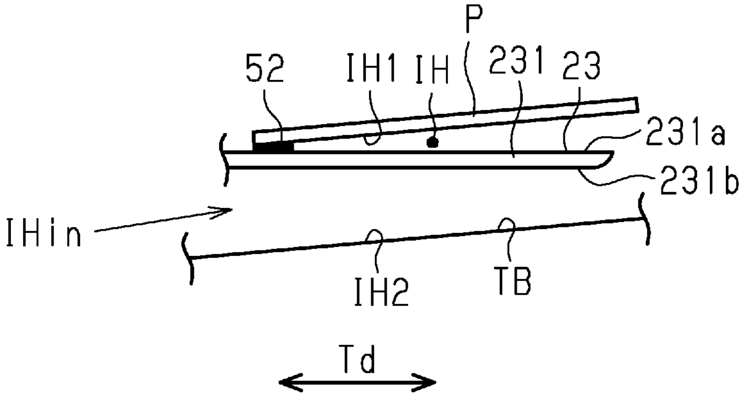
FIG. 8 is a diagram illustrating one example of a state in which the forks are horizontal and the placement surface is inclined during the placing operation.
Figure 9:
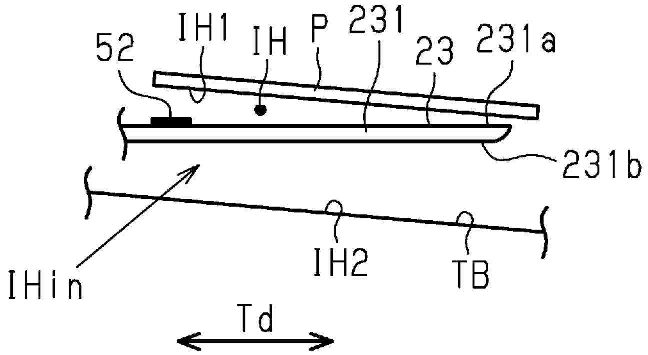
FIG. 9 is a diagram illustrating one example of a state in which the forks are horizontal and the placement surface is inclined during a placing operation.
Figure 10:
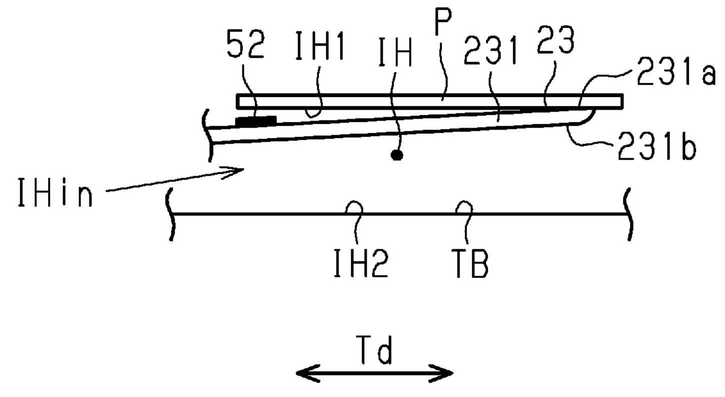
FIG. 10 is a diagram illustrating a state in which the forks are tilted rearward and the placement surface is horizontal during the placing operation.
Figure 11:
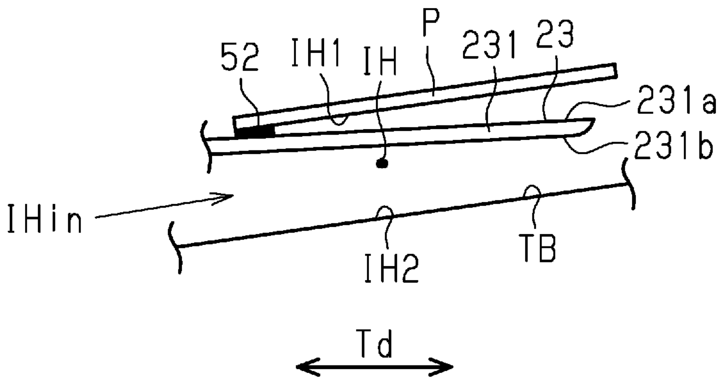
FIG. 11 is a diagram illustrating one example of a state in which the forks are tilted rearward and the placement surface is inclined during the placing operation.
Figure 12:
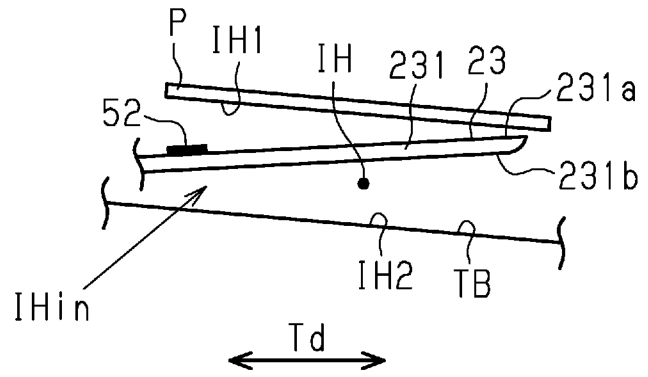
FIG. 12 is a diagram illustrating one example of a state in which the forks are tilted rearward and the placement surface is inclined during a placing operation.

Relationship between State of Placement Surface, Tilt of Forks, and Contact State of Detection Sensor with First Facing Surface FIGS. 7, 8, and 9 illustrate a case in which the insertion portions 231 of the forks 23 are horizontal during the placing operation. FIGS. 10, 11 and 12 show a case in which the forks 23 are tilted rearward during the placing operation.

As shown in FIGS. 7 to 12, depending on the degree of sinking of the suspension of the truck T, the placement surface TB may be kept horizontal or may be inclined with respect to the vehicle width direction Td of the truck T.

When the placement surface TB is kept horizontal as shown in FIGS. 7 and 10, the insertion opening IH also extends horizontally in the vehicle width direction of the truck T.

The detection sensor 52 is in contact with the first facing surface IH1 when the pallet P is placed on the horizontal placement surface TB in a state in which the insertion portions 231 are horizontal as shown in FIG. 7.

As shown in FIG. 10, the detection sensor 52 is separated from the first facing surface IH1 when the pallet P is placed on the horizontal placement surface TB in a state in which the insertion portions 231 are tilted rearward.

In a case in which the placement surface TB is inclined so as to approach the distal ends of the insertion portions 231 in the direction in which the insertion portions 231 extend from the proximal ends toward the distal ends as shown in FIGS. 8 and 11, the insertion opening IH is tilted rearward in correspondence with the placement surface TB.

The detection sensor 52 is in contact with the first facing surface IH1 when the pallet P is placed on the placement surface TB inclined rearward in a state in which the insertion portions 231 are horizontal as shown in FIG. 8.

The detection sensor 52 is in contact with the first facing surface IH1 when the pallet P is placed on the placement surface TB inclined rearward in a state in which the insertion portions 231 are tilted rearward as shown in FIG. 11.

In a case in which the placement surface TB is inclined so as to separate away from the distal ends of the insertion portions 231 in the direction in which the insertion portions 231 extend from the proximal ends toward the distal ends as shown in FIGS. 9 and 12, the insertion opening IH is tilted forward in correspondence with the placement surface TB.

The detection sensor 52 is separated from the first facing surface IH1 when the pallet P is placed on the placement surface TB inclined forward in a state in which the insertion portions 231 are horizontal as shown in FIG. 9.

The detection sensor 52 is separated from the first facing surface IH1 when the pallet P is placed on the placement surface TB inclined forward in a state in which the insertion portions 231 are tilted rearward as shown in FIG. 12.

Relationship between State of Placement Surface and Stopping Process

The relationship between the state of the placement surface TB and the stopping process S2 will now be described.

Figure 13:
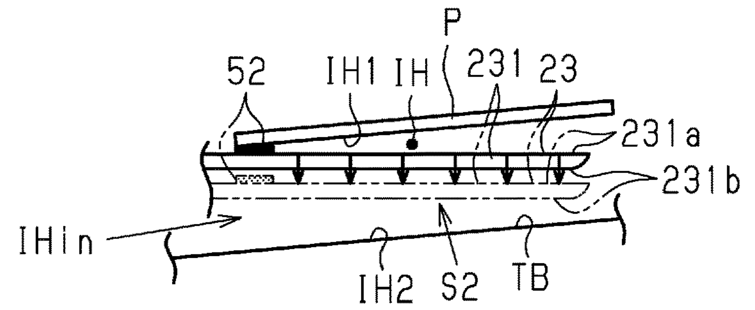
FIG. 13 is a diagram showing a stopping process executed by a controlling device of the forklift shown in FIG. 1.

For example, the detection sensor 52 is in contact with the first facing surface IH1 when the pallet P is placed on the placement surface TB inclined rearward in a state in which the insertion portions 231 are horizontal as shown in FIG. 13. At this time, the placing operation continues to lower of the forks 23. Then, when the forks 23 are lowered so that the detection sensor 52 is separated from the first facing surface IH1 as indicated by the long-dash double-short-dash line in FIG. 13, the stopping process S2 is executed. The state of the placement surface TB and the state of the forks 23 shown in FIG. 13 are the same as the state of the placement surface TB and the state of the forks 23 shown in FIG. 8.

If the detection sensor 52 is in contact with the first facing surface IH1 at the time when the pallet P is placed on the placement surface TB as shown in FIGS. 7, 8, and 11, the forks 23 continue to be lowered in the placing operation. Then, when the detection sensor 52 is separated from the first facing surface IH1, the stopping process S2 is executed.

If the detection sensor 52 is separated from the first facing surface IH1 at the time when the pallet P is placed on the placement surface TB as shown in FIGS. 9, 10, and 12, the stopping process S2 is executed upon placement of the pallet P on the placement surface TB.

As described above, the stopping process S2 is a process of continuing to lower the forks 23 unless the detection sensor 52 is separated from the first facing surface IH1 in the placing operation. The stopping process S2 is a process of stopping lowering of the forks 23 in the placing operation when the detection sensor 52 is separated from the first facing surface IH1.

Tilt of Insertion Opening and Forward Tilting Process

The forward tilting process S3, which is executed, for example, after the stopping process S2 illustrated in FIG. 13, will now be described.

Figure 14:
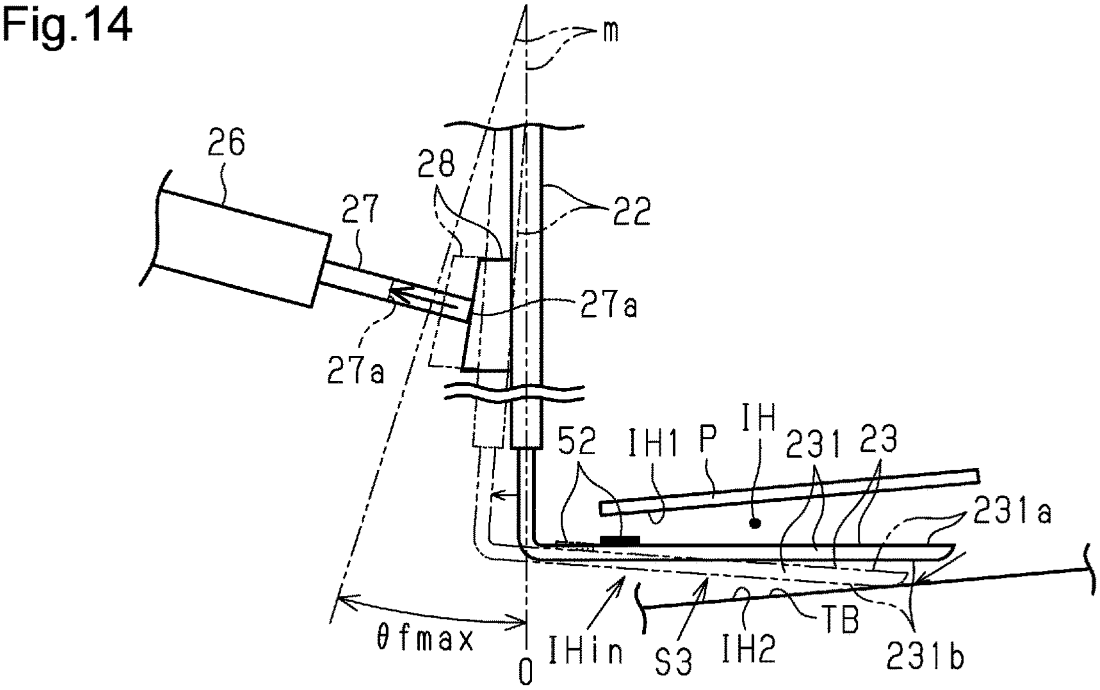
FIG. 14 is a diagram showing a forward tilting process executed by the controlling device of the forklift shown in FIG. 1.

The forward tilting process S3 is a process of retracting the tilt rod 27 into the cylinder tube 26*a* so as to tilt the forks 23 forward until the tilt angle θ reaches the limit value θfmax as shown in FIG. 14. When the insertion opening IH is tilted rearward, the distal ends of the insertion portions 231 inevitably come into contact with the second facing surface IH2 before the tilt angle θ reaches the limit value θfmax. Therefore, when the insertion opening IH is tilted rearward, the distal end 27*a* of the tilt rod 27 is inevitably separated from the finger bar 28 as shown by the broken line in FIG. 14. That is, when the distal ends of the insertion portions 231 are in contact with the second facing surface IH2 and the tilt rod 27 is retracted into the cylinder tube 26*a*, the forward tilting of the forks 23 is stopped, so that tilt angle θ stops changing.

Even when the insertion opening IH extends horizontally as shown in FIGS. 7 and 10, the execution of the forward tilting process S3 inevitably causes the distal ends of the insertion portions 231 to come into contact with the second facing surface IH2 before the tilt angle θ reaches the limit value θfmax. Therefore, the distal end 27*a* of the tilt rod 27 is inevitably separated from the finger bar 28. That is, when the distal ends of the insertion portions 231 are in contact with the second facing surface IH2 and the tilt rod 27 is retracted into the cylinder tube 26*a*, the forward tilting of the forks 23 is stopped, so that tilt angle θ stops changing.

As shown in FIGS. 9 and 12, when the insertion opening IH is tilted forward, the tilt angle θ may reach the limit value θfmax depending on the degree of forward tilt of the placement surface TB. When the placement surface TB is tilted forward to a great extent, there is a possibility that the distal ends of the insertion portions 231 do not come into contact with the second facing surface IH2 until the tilt angle θ reaches the limit value θfmax. Step S4 executed by the controlling device 30 is a process executed on the assumption that the placement surface TB is tilted forward to a great extent.

Returning Process

For example, the returning process S7 executed after the forward tilting process S3 illustrated in FIG. 14 will now be described.

Figure 15:
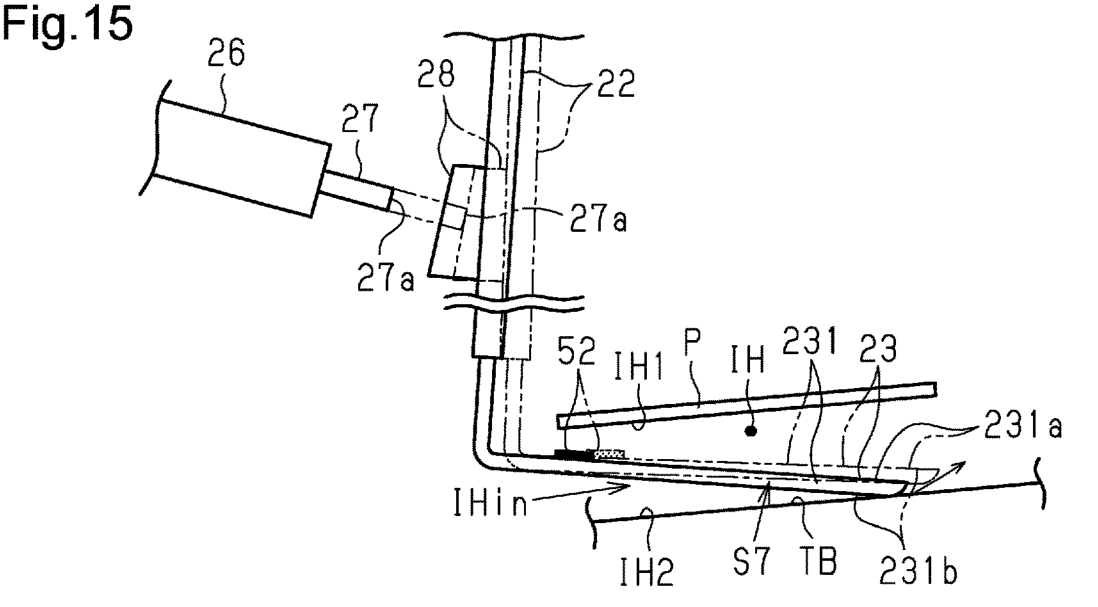
FIG. 15 is a diagram showing a returning process executed by the controlling device of the forklift shown in FIG. 1.

As shown in FIG. 15, the returning process S7 is a process of protruding the tilt rod 27 from the cylinder tube 26*a* in order to tilt the forks 23 rearward by a specified angle after the forward tilting process S3. The returning process S7 is a process of causing the distal ends of the insertion portions 231 to be separated from the second facing surface IH2. The specified angle is, for example, 1°. The specified angle is a value that is set in advance by confirming that the detection sensor 52 does not come into contact with the first facing surface IH1 if the forks 23 are tilted rearward by the specified angle from a state in which the distal ends of the insertion portions 231 of the forks 23 are in contact with the second facing surface IH2.

Also, the specified angle is a value that is set in advance set by confirming that the distal ends of the insertion portions 231 do not come into contact with the first facing surface IH1 if the forks 23 are tilted rearward by the specified angle from a state in which the distal ends of the insertion portions 231 of the forks 23 are in contact with the second facing surface IH2.

Although the above description of the returning process S7 assumes a case in which the insertion opening IH is tilted rearward, the returning process S7 also applies to a case in which the insertion opening IH is horizontal or the insertion opening IH is tilted forward. In other words, the manner in which the specified angle is set in the returning process S7 applies even if the degree of tilting of the insertion opening IH is changed. In other words, regardless of the degree of tilting of the insertion opening IH, the returning process S7 tilts the forks 23 rearward such that the insertion portions 231 or the detection sensor 52 do not come into contact with the first facing surface IH1.

Removing Processes

Each of the removing processes S5, S9, and S11 will now be described.

The removing processes S5, S9, and S11 are processes executed after the returning process S7 or after the tilt angle θ reaches the limit value θfmax in the forward tilting process S3. In the removing processes S5, S9, and S11, the target position calculating unit 37 replaces the voltage value VV* with the voltage value VV that corresponds to a state in which the accelerator manipulation unit 164 is not manipulated. In the removing processes S5, S9, and S11, the target position calculating unit 37 replaces the voltage value θV* with the voltage value θV that corresponds to a state in which the tilt manipulation unit 163 is not manipulated. That is, the tilt device and the traveling motor 15 do not operate during the execution of the removing processes S5, S9, and S11.

Figure 16:
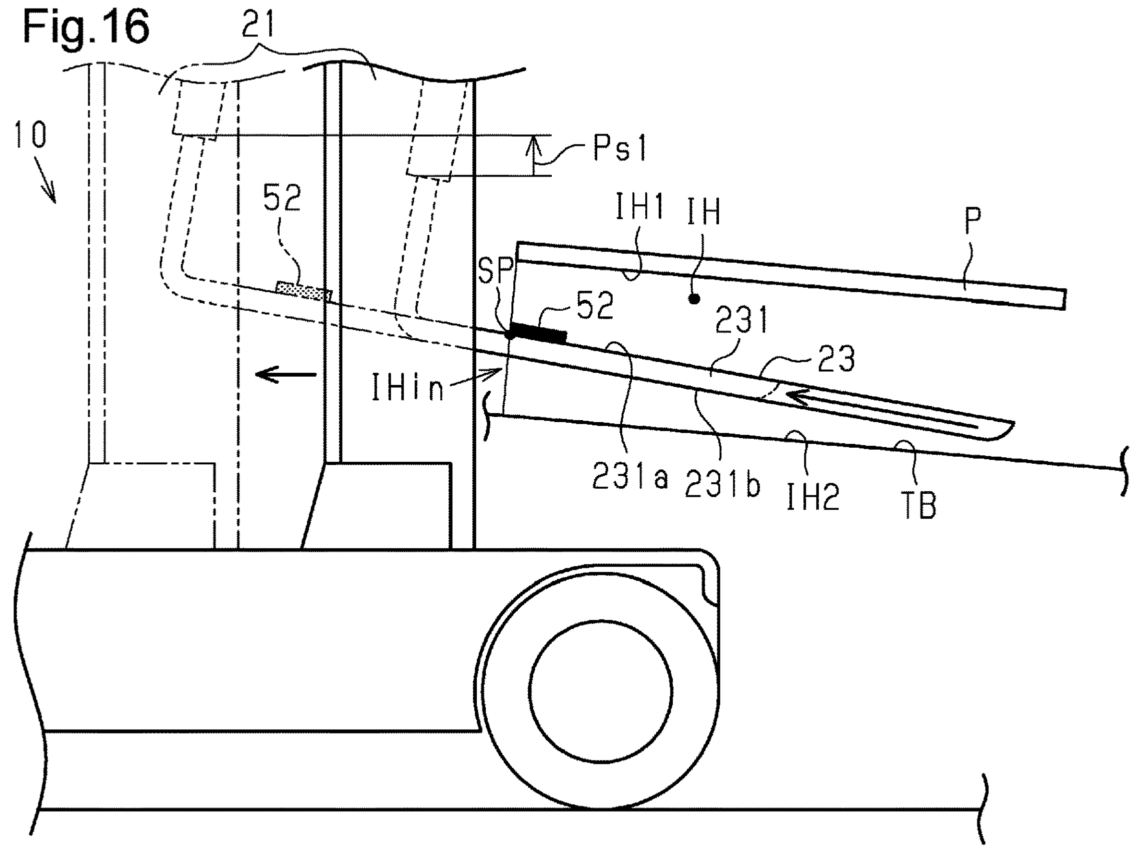
FIG. 16 is a diagram showing one example of a removing process executed by the controlling device of the forklift shown in FIG. 1.

As shown in FIG. 16, the removing process S5 is a process of removing the insertion portions 231 from the insertion opening IH such that a position SP of the insertion portions 231 with respect to the entrance IHin of the insertion opening IH does not change when the forks 23 are tilted forward. The position SP is a position at which the insertion portions 231 intersect with a plane of opening that includes the entrance IHin as the outer edge. The removing process S5 is a process of raising the forks 23 at a speed Ps1 while retracting the mast assemblies 21. The speed Ps1 is set such that the position SP does not change when the insertion portions 231 are removed from the insertion opening IH.

The storage unit 32 of the controlling device 30 stores expressions or maps representing a correlation between the speed at which the mast assemblies 21 are retracted, the tilt angle θ of the forks 23, and the speed Ps1. In the removing process S5, the target position calculating unit 37 calculates a retracting speed of the mast assemblies 21 based on the calculated movement amount PR. In the removing process S5, the target position calculating unit 37 calculates the speed Ps1 using the calculated retracting speed of the mast assemblies 21 and the calculated tilt angle θ, while referring to the expressions or the maps described above. In the removing process S5, the target position calculating unit 37 calculates a target fork height PL* for achieving the calculated speed Ps1. In the removing process S5, the target position calculating unit 37 outputs, to the internal controller 33, the voltage value LV*, which has been calculated based on the target fork height PL* for achieving the speed Ps1. In the removing process S5, the internal controller 33 outputs, to the hydraulic mechanism 40, a command value corresponding to the voltage value LV* for achieving the speed Ps1. In the removing process S5, the target position calculating unit 37 outputs, to the internal controller 33, the voltage value RV*, which has been calculated based on the target mast position PR*. In the removing process S5, the internal controller 33 outputs a command value corresponding to the voltage value RV* to the hydraulic mechanism 40. In the removing process S5, the mast assemblies 21 are retracted while the forks 23 are raised at the speed Ps1. Therefore, the removing process S5 is a process in which the controlling device 30 controls the lift device and the moving device to remove the insertion portions 231 from the insertion opening IH.

Figure 17:
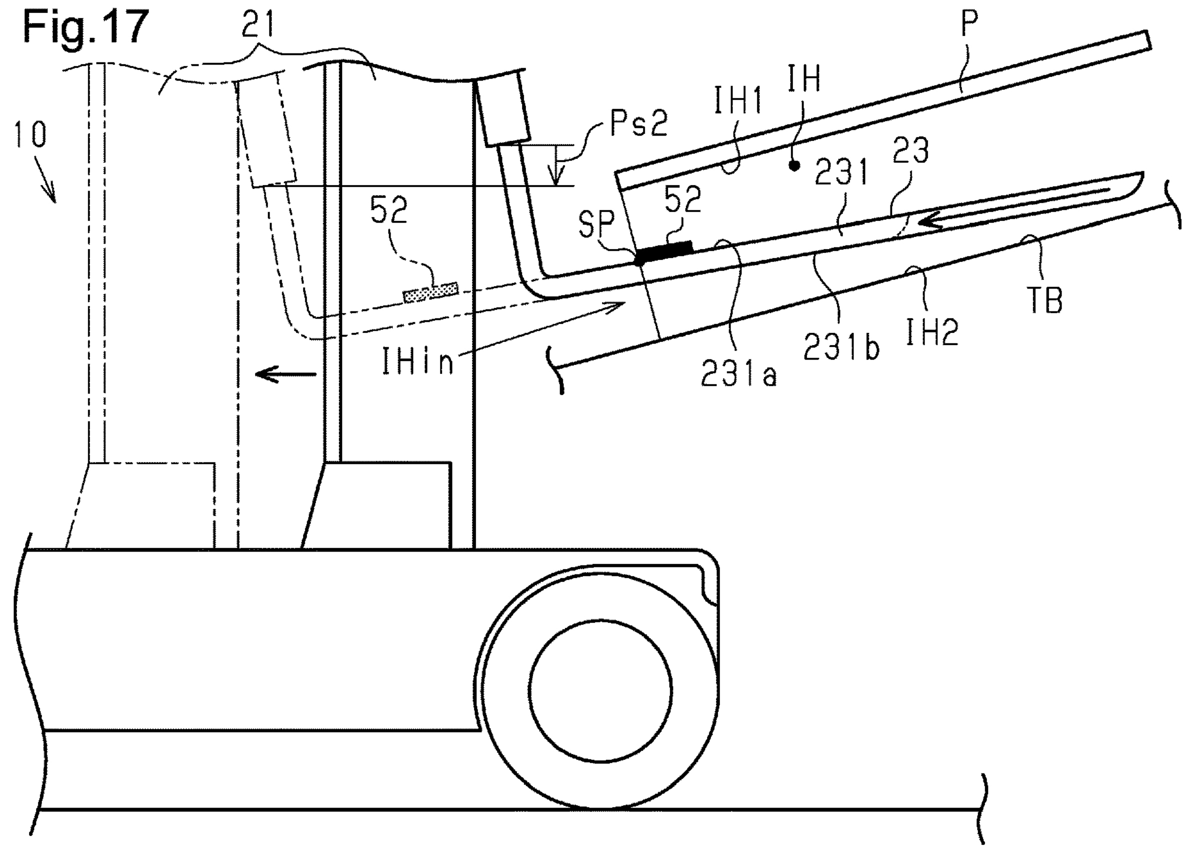
FIG. 17 is a diagram showing one example of the removing process executed by the controlling device of the forklift shown in FIG. 1.

As shown in FIG. 17, the removing process S11 is a process of removing the insertion portions 231 from the insertion opening IH such that a position SP of the insertion portions 231 with respect to the entrance IHin of the insertion opening IH does not change when the forks 23 are tilted rearward. The removing process S11 is a process of lowering the forks 23 at a speed Ps2 while retracting the mast assemblies 21. The speed Ps2 is set such that the position SP does not change when the insertion portions 231 are removed from the insertion opening IH.

The storage unit 32 of the controlling device 30 stores expressions or maps representing a correlation between the speed at which the mast assemblies 21 are retracted, the tilt angle θ of the forks 23, and the speed Ps2. In the removing process S11, the target position calculating unit 37 calculates a retracting speed of the mast assemblies 21 based on the calculated movement amount PR. In the removing process S11, the target position calculating unit 37 calculates the speed Ps2 using the calculated retracting speed of the mast assemblies 21 and the calculated tilt angle θ, while referring to the expressions or the maps described above. In the removing process S11, the target position calculating unit 37 calculates a target fork height PL* for achieving the calculated speed Ps2. In the removing process S11, the target position calculating unit 37 outputs, to the internal controller 33, the voltage value LV*, which has been calculated based on the target fork height PL* for achieving the speed Ps2. In the removing process S11, the internal controller 33 outputs, to the hydraulic mechanism 40, a command value corresponding to the voltage value LV* for achieving the speed Ps2. In the removing process S11, the target position calculating unit 37 outputs, to the internal controller 33, the voltage value RV*, which has been calculated based on the target mast position PR*. In the removing process S11, the internal controller 33 outputs a command value corresponding to the voltage value RV* to the hydraulic mechanism 40. In the removing process S11, the mast assemblies 21 are retracted while the forks 23 are lowered at the speed Ps2. Therefore, the removing process S11 is a process in which the controlling device 30 controls the lift device and the moving device to remove the insertion portions 231 from the insertion opening IH.

Although not illustrated, the removing process S9 is a process of removing the insertion portions 231 from the insertion opening IH such that the position SP of the insertion portions 231 with respect to the entrance IHin of the insertion opening IH does not change when the forks 23 are horizontal. The removing process S9 is a process of retracting the mast assemblies 21.

In the removing process S9, the target position calculating unit 37 outputs, to the internal controller 33, the voltage value RV*, which has been calculated based on the target mast position PR*. In the removing process S9, the internal controller 33 outputs a command value corresponding to the voltage value RV* to the hydraulic mechanism 40. In the removing process S9, the target position calculating unit 37 replaces the voltage value LV* with the voltage value VV that corresponds to a state in which the lift manipulation unit 162 is not manipulated. The removing process S9 is a process in which the controlling device 30 controls the moving device to remove the insertion portions 231 from the insertion opening IH. As described above, the removing processes S5, S9, and S11 are processes of removing the insertion portions 231 from the insertion opening IH by controlling at least the moving device, of the lift device and the moving device, such that the position SP does not change.

Operation of Present Embodiment

Operation of the present embodiment will now be described.

The stopping process S2 stops lowering of the forks 23 in a state in which the detection sensor 52 is not in contact with the first facing surface IH1. The stopping process S2 thus separates the bases of the insertion portions 231 from the first facing surface IH1. In the forward tilting process S2 after the stopping process S3, the forks 23 are tilted forward until the tilt angle θ reaches the limit value θfmax. Thus, in many cases, the distal ends of the forks 23 come into contact with the second facing surface IH2 before the tilt angle θ reaches the limit value θfmax. Then, the returning process S7, which is executed after the forward tilting process S3, separates the distal ends of the insertion portions 231, which have been in contact with the second facing surface IH2, from the second facing surface IH2. The distal ends of the insertion portions 231 are not pressed against the second facing surface IH2 in a case in which the tilt angle θ reaches the limit value θfmax in the forward tilting process S3. Therefore, the returning process S7 is not executed in a case in which the tilt angle θ reaches the limit value θfmax in the forward tilting process S3. As a result, the bases of the forks 23 are separated from the first facing surface IH1, and the distal ends of the forks 23 are separated from the second facing surface IH2. This prevents the forks 23 and each of the first facing surface IH1 and the second facing surface IH2 from being in contact with each other before the forks 23 are removed from the insertion opening IH. The execution of any of the removing processes S5, S9, and S11 allows the insertion portions 231 to be removed from the insertion opening IH without coming into contact with the surfaces defining the insertion opening IH.

Advantages of Present Embodiment

The present embodiment has the following advantages.

(1) The execution of the stopping process S2, the forward tilting process S3, and the returning process S7 prevents the forks 23 from contacting the surfaces that define the insertion opening IH before the forks 23 are removed from the insertion opening (2) The removing processes S5, S9, and S11 allow the insertion portions 231 to be removed from the insertion opening IH while maintaining a state in which the insertion portions 231 are not in contact with the first facing surface IH1 or the second facing surface IH2. Therefore, since the forks 23 do not catch on the first facing surface IH1 or the second facing surface IH2, the forks 23 are readily removed from the insertion opening IH.

(3) When the insertion portions 231 come into contact with the second facing surface IH2 during the execution of the forward tilting process S3, the tilt rod 27 is retracted into the cylinder tube 26*a* to be separated from the finger bar 28 while the insertion portions 231 remain in contact with the second facing surface IH2. The insertion portions 231 are thus not pressed against the second facing surface IH2 when the tilt angle θ of the forks 23 stops changing. This prevents the forks 23 from receiving an excessive stress before the returning process S7 is executed.

(4) Even when the placement surface TB is tilted, the insertion portions 231 do not drag the pallet P when the insertion portions 231 are removed from the insertion opening IH.

(5) The tilt sensor 56 is a sensor that is typically mounted on the forklift 10. Therefore, it is possible to detect that the insertion portions 231 are in contact with the second facing surface IH2 by observing changes in the tilt angle θ using an existing sensor. Since it is not necessary to provide an additional sensor for detecting that the insertion portions 231 are in contact with the second facing surface IH2, the costs of the forklift 10 are not increased.

Modifications

The above-described embodiment may be modified as follows. The above-described embodiment and the following modifications can be combined as long as the combined modifications remain technically consistent with each other.

The distal end 27*a* of the tilt rod 27 may be configured to contact and separate from the lift bracket 22, instead of the finger bar 28. The distal end 27*a* of the tilt rod 27 may be configured to contact and separate from any part of the attachment portion.

The distal end 27*a* of the tilt rod 27 may be fixed to the finger bar 28 or the lift bracket 22. In this case, the center of gravity of the carriage 100 does not necessarily need to be set such that the forks 23 tilt forward under their own weight in a state in which the carriage 100 is not supported by the tilt rod 27.

The forklift 10 may be a counterbalance forklift. In this case, the forks 23 may be tilted by tilting the mast assemblies 21 by changing the hydraulic pressure in the tilt cylinder 26. In this modification, the lift bracket 22 may be fixed to the mast assemblies 21. The tilt sensor 56 detects the tilt angle of the mast assemblies 21 as the tilt angle θ of the forks 23.

The process of step S8, the process of step S10, and the removing processes S5, S9, and S11 may be omitted from the processes executed by the controlling device 30. When determining in step S4 that the tilt angle θ has reached the limit value θfmax (step S4: YES) or when executing the returning process S7, the controlling device 30 may end the process. That is, the operation of removing the insertion portions 231 from the insertion opening IH may be performed by the operator.

In the placing operation, the process of lowering the forks 23 is automatically executed by the controlling device 30. However, this process may be executed by the operator. In this case, when the detection sensor 52 is separated from the first facing surface IH1 while the forks 23 are being lowered by manipulation of the lift manipulation unit 162 by the operator in the placing operation, the stopping process S2 may be executed regardless of the manipulation of the lift manipulation unit 162 by the operator.

The unloading operation may be performed by the operator.

In the unloading operation and the placing operation, the mast assemblies 21 are extended and retracted. However, for example, the forks 23 may be moved back and forth by moving the forklift 10 back and forth by the traveling motor 15. That is, the moving device may be the traveling motor 15. When the traveling motor 15 is used as the moving device, the retraction of the mast assemblies 21 in the removing processes S5, S9, and S11 is replaced with the backward movement of the forklift 10. The expressions or the maps used to calculate the speeds Ps1 and Ps2 are changed to those representing the correlation between the speed of the forklift 10, the tilt angle θ of the forks 23, and the speeds Ps1 and Ps2.

The traveling motor 15, the reach cylinder 24, and the hydraulic mechanism 40 may be used as the moving devices. When the traveling motor 15, the reach cylinder 24, and the hydraulic mechanism 40 are used as the moving devices, not only the retraction of the mast assemblies 21, but also the backward movement of the forklift 10, are additionally executed in the removing processes S5, S9, and S11. The expressions or the maps used to calculate the speeds Ps1 and Ps2 are changed to those representing the correlation between the speed of the retraction of the mast assemblies 21, the speed of the forklift 10, the tilt angle θ of the forks 23, and the speeds Ps1 and Ps2.

The insertion opening IH may be a hole formed in the pallet P. In this case, of the surfaces defining the insertion opening IH, a surface facing the first surfaces 231*a* of the insertion portions 231 is defined as the first facing surface IH1, and a surface facing the second surfaces 231*b* of the insertion portions 231 is defined as the second facing surface IH2.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A forklift, comprising:

a vehicle body;

a fork configured to mount a pallet, an opening into which the fork is inserted when the pallet is mounted on the fork being an insertion opening, the fork including an insertion portion that is inserted into the insertion opening, surfaces that define the insertion opening including a first facing surface that is located above the insertion portion when the fork is inserted into the insertion opening and a second facing surface that faces the first facing surface;

a lift device that is configured to lift or lower the fork;

a tilt device that is configured to tilt the fork;

a tilt sensor that is configured to output a signal corresponding to a tilt angle of the fork;

processing circuitry that is configured to control the lift device and the tilt device; and a detection sensor provided in the insertion portion, the detection sensor being disposed closer to a base of the insertion portion than to a distal end of the insertion portion so as to correspond to an entrance of the insertion opening when the fork is inserted into the insertion opening, and the detection sensor being configured to detect whether the insertion portion is in contact with the first facing surface, wherein the forklift is configured to perform, with the lift device, a placing operation of placing the pallet on a placement surface by lowering the fork with the pallet mounted on the fork, the processing circuitry is configured to execute:

a stopping process of stopping lowering of the fork by the lift device when the detection sensor is separated from the first facing surface while the fork is being lowered by the lift device in the placing operation;

a forward tilting process executed after execution of the stopping process, the forward tilting process controlling the tilt device to tilt the fork forward until the tilt angle reaches a limit value and sequentially obtaining values of the tilt angle calculated based on a signal from the tilt sensor during execution of the forward tilting process; and a returning process controlling the tilt device to tilt the fork rearward such that the insertion portion or the detection sensor is separate from the first facing surface when the value of the tilt angle stops changing before the tilt angle reaches the limit value, and the returning process is not executed in a case in which the tilt angle reaches the limit value.

2. The forklift according to claim 1, further comprising a moving device that is configured to move the fork forward or rearward, wherein the processing circuitry is configured to execute a removing process after the returning process or after the tilt angle reaches the limit value in the forward tilting process, and the removing process removes the insertion portion from the insertion opening by controlling at least the moving device, of the lift device and the moving device, such that a position of the insertion portion in a height direction with respect to the entrance of the insertion opening is not changed.

3. The forklift according to claim 1, wherein the forklift is a reach forklift, the fork is attached to an attachment portion that is displaced integrally with the fork by the lift device and the tilt device, and the tilt device includes:

a tilt cylinder; and a hydraulic mechanism that is configured to be controlled by the processing circuitry to control supply of hydraulic fluid to and drainage of the hydraulic fluid from the tilt cylinder, the tilt cylinder includes a tilt rod that is selectively protruded from and retracted into a cylinder tube by supply and drainage of the hydraulic fluid, a distal end of the tilt rod being configured to contact and separate from the attachment portion, and the fork is configured such that when the tilt rod is protruded from the cylinder tube so that the distal end of the tilt rod pushes the attachment portion, the fork tilts rearward, and when the tilt rod is retracted into the cylinder tube so that the distal end of the tilt rod separates from the attachment portion, the fork tilts forward under its own weight.

4. A forklift controlling method, wherein the forklift includes a vehicle body and a fork that is configured to mount a pallet, an opening into which the fork is inserted when the pallet is mounted on the fork is an insertion opening, the fork includes an insertion portion that is inserted into the insertion opening, surfaces that define the insertion opening include a first facing surface that is located above the insertion portion when the fork is inserted into the insertion opening and a second facing surface that faces the first facing surface, and the forklift controlling method comprises:

performing a placing operation of placing the pallet on a placement surface by lowering the fork with the pallet mounted on the fork;

detecting whether the insertion portion is in contact with the first facing surface during the placing operation;

executing a stopping process of stopping lowering of the fork when contact of the insertion portion with the first facing surface stops being detected while the fork is being lowered in the placing operation;

executing a forward tilting process after execution of the stopping process, the forward tilting process tilting the fork forward such that a tilt angle of the fork becomes a limit value;

sequentially obtaining values of the tilt angle during execution of the forward tilting process; and during execution of the forward tilting process executing a returning process of tilting the fork rearward when the value of the tilt angle stops changing before the tilt angle reaches the limit value, and not executing the returning process in a case in which the tilt angle reaches the limit value.

* * * * *